A. BLISS.
TOP FOR CANS AND CANISTERS.
No. 8,440. Patented Oct. 21, 1851.
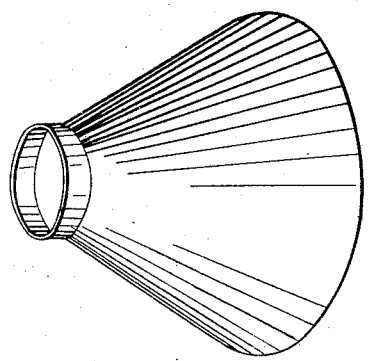
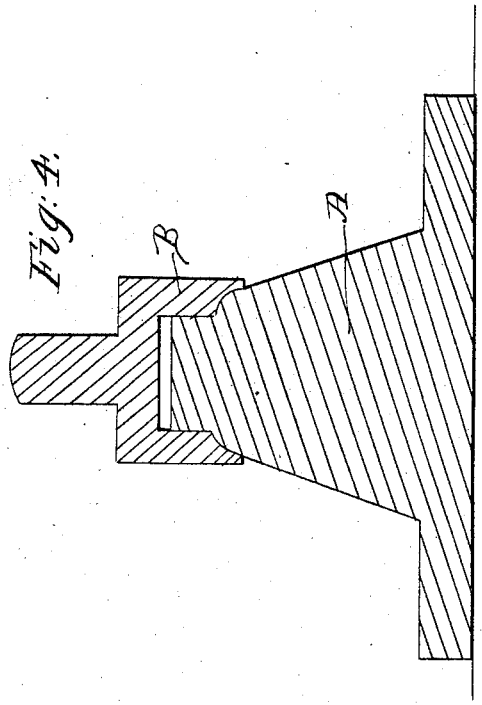
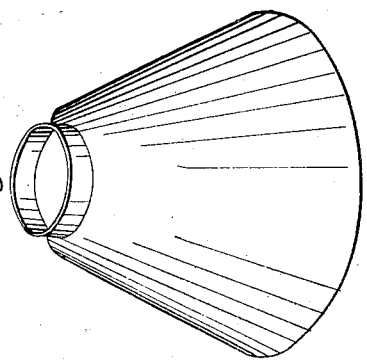
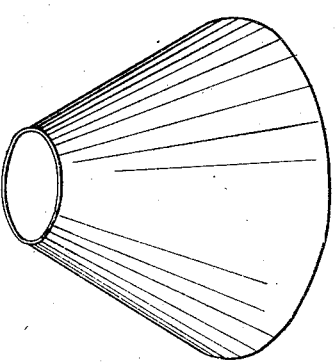

UNITED STATES PATENT OFFICE.

ALFRED BLISS, OF NEWARK, NEW JERSEY.

IMPROVEMENT IN THE TOPS OF CANS OR CANISTERS.

Specification forming part of Letters Patent No. 8,440, dated October 21, 1851.

*To all whom it may concern:*

Be it known that I, ALFRED BLISS, of Newark, in the county of Essex and State of New Jersey, have invented a new and useful Improvement in the Manufacture of Sheet-Metal Tea-Canisters; and I do hereby declare that the following is a full, clear, and exact description thereof, reference being had to the accompanying drawings, and letters marked thereon, forming a part of this specification.

The nature of my invention consists in raising a ring or collar on the conical frustum to form the mouth or aperture of canisters, &c., over which the cap or cover fits, by means of a die or its equivalent, instead of soldering a separate one on, as heretofore. This method possesses a great advantage over the usual and common way of cutting out, bending, and soldering a ring separately, and then soldering the ring onto the canister, by which there is a great waste of metal. My method not only obviates this waste of metal and the time required to cut, bend, and solder the ring separately and then onto the canister, but I dispense with two solderings and produce a much neater, cheaper, and more durable article.

In the accompanying drawings, Figure 1 represents the conical rim or hoop forming the upper part of a tea-canister before it is submitted to the die, which is made sufficiently large to give the desired height to the ring. Fig. 2 represents the conical frustum or hoop with a collar formed separately and then soldered on, as is the usual and common method in practice. Fig. 3 represents the conical frustum or hoop with a collar raised in a single piece with it, after my improved method.

In raising the collar forming the mouth of the canister I proceed as follows: The conical frustum or hoop is cut out to fit the canister and soldered in the usual manner, but sufficiently large to allow for the height of the collar. It is then placed over the cone A of the die, Fig. 4, and the counter-die B forced upon it under a screw-press, or by giving a few smart blows on the top of the die with a mallet. The upper part or apex of the conical frustum is thus forced to assume the form of the die, completing in a few seconds the desired object, which by the usual and common way occupies considerable time, &c.

Having thus fully described my invention and the advantages thereof, what I claim therein as new, and desire to secure by Letters Patent, is—

The swaging or striking up the collar to receive the cover on the conical frustum in place of soldering a separate one on, as heretofore.

In testimony whereof I have hereunto signed my name before two subscribing witnesses.

ALFRED BLISS.

Witnesses:
 MOSES R. KING,
 N. E. JAMES.